(12) United States Patent
Kimishima et al.

(10) Patent No.: US 7,093,630 B2
(45) Date of Patent: Aug. 22, 2006

(54) HEAVY DUTY RADIAL TIRE

(75) Inventors: Takahiro Kimishima, Kobe (JP); Satoshi Tsuda, Kobe (JP); Minoru Nishi, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 0 days.

(21) Appl. No.: 10/742,868

(22) Filed: Dec. 23, 2003

(65) Prior Publication Data

US 2004/0154716 A1   Aug. 12, 2004

(30) Foreign Application Priority Data

Dec. 26, 2002  (JP) .............................. 2002-377792

(51) Int. Cl.
 *B60C 11/00*   (2006.01)
 *B60C 11/03*   (2006.01)

(52) U.S. Cl. .......................... 152/209.14; 152/209.27; 152/902

(58) Field of Classification Search ........... 152/209.14, 152/209.18, 454, 209.27, 902
See application file for complete search history.

(56) References Cited

U.S. PATENT DOCUMENTS

| | | |
|---|---|---|
| 5,616,195 A | 4/1997 | Marquet et al. |
| 5,647,925 A | 7/1997 | Sumiya et al. |
| 5,660,652 A | 8/1997 | Young et al. |
| 6,116,309 A * | 9/2000 | Gillard et al. ......... 152/209.14 |
| 6,220,321 B1 * | 4/2001 | Yoshioka et al. ...... 152/209.18 |
| 6,408,908 B1 * | 6/2002 | Scarpitti et al. ....... 152/209.14 |
| 2002/0124928 A1 * | 9/2002 | Carra et al. ................. 152/523 |

FOREIGN PATENT DOCUMENTS

| | | | |
|---|---|---|---|
| JP | 2-81704 | * | 3/1990 |
| JP | 4-228308 | * | 8/1992 |
| JP | 5-77608 A | | 3/1993 |
| JP | 5-77609 A | | 3/1993 |
| JP | 8-002210 A | | 1/1996 |
| JP | 2002-307913 | * | 10/2002 |

* cited by examiner

*Primary Examiner*—Steven D. Maki
(74) *Attorney, Agent, or Firm*—Birch, Stewart, Kolasch & Birch, LLP

(57) ABSTRACT

A heavy duty radial tire which is provided with traverse grooves extending between the tread edges and longitudinal grooves extending between the traverse grooves so as to form shoulder blocks arranged along each of the tread edges and inner blocks each disposed on the axially inside of one of the shoulder blocks. The longitudinal grooves between the shoulder blocks and the inner blocks have a depth Dga of 0.7 to 1.0 times the depth Dy of the traverse grooves, and the longitudinal grooves are each inclined at an acute angle with respect to the circumferential direction to have an axial extent range Y whose axial width W1 is in a range of from 1.0 to 10.0 times the width Wga. In a cross section of the tire under a normally inflated unloaded condition, the tread profile is made up of a center profile Si and a shoulder profile So. The shoulder profile So extends continuously from each of the axial ends of the center profile Si through an inflection point P to one of the tread edges. The center profile Si is a circular arc of a radius Rc having the center on the tire equatorial plane, and the shoulder profile So is a substantially straight line or alternatively an arc having less curvature than the center profile Si. The inflection point P is located within the axial extent range Y of the longitudinal grooves.

3 Claims, 3 Drawing Sheets

HEAVY DUTY RADIAL TIRE

This Non-provisional application claims priority under 35 U.S.C. § 119(a) on Patent Application No. 2002-377792 filed in Japan on Dec. 26, 2002, the entire contents of which are hereby incorporated by reference.

The present invention relates to a pneumatic tire, more particularly to a combination of a tread pattern and a tread profile suitable for a heavy duty radial tire for the driving wheels of a dump truck.

Pneumatic tires for dump trucks used on rough terrain are conventionally provided with lug-type tread patterns to obtain a good road grip.

In recent year, on the other hand, even in such dump trucks, occasions to travel on the well paved roads are increasing accompanied with the road net improvement. Therefore, there is a trend to use block-type tread patterns instead of the lug-type tread patterns, giving greater importance to steering stability, wet performance and the like on the well paved roads. Further, there is another trend in the heavy duty tires to adopt wide tread radial ply structure from the point of view of durability, steering stability and the like.

Basically, the use of a block-type tread pattern invites lowering of the tread pattern rigidity, and the wide tread is liable to cause uneven ground pressure distribution between the tread center and tread shoulder. As a result, uneven wear of the tread portion called heel and toe wear is very liable to occur on the tread blocks in the tread shoulder region.

It is therefore, an object of the present invention to provide a heavy duty radial tires which is effectively improved in the uneven wear resistance as well as off-road grip or traction by specifically defining the tread profile and tread block arrangement.

According to the present invention, a heavy duty radial tire comprises a tread portion with tread edges, wherein the tread portion is provided with traverse grooves extending between the tread edges and longitudinal grooves extending between the traverse grooves so as to form shoulder blocks arranged along each of the tread edges, and inner blocks each disposed on the axially inside of one of the shoulder blocks, the longitudinal grooves between the shoulder blocks and the inner blocks, have a depth Dga in a range of from 0.7 to 1.0 times the depth Dy of the traverse grooves, the longitudinal grooves are each inclined at an acute angle with respect to the circumferential direction of the tire to have an axial extent W1 of from 1.0 to 10.0 times the width Wga, in the cross section of the tire under the normally inflated unloaded condition:

the tread portion is provided with a tread profile made up of
  a center profile Si and a shoulder profile So, wherein the shoulder profile So extends continuously from each of the axial ends of the center profile Si through an inflection point P to one of the tread edges;
the center profile Si is a circular arc of a radius Rc having the center on the tire equatorial plane, and the shoulder profile So is a substantially straight line or alternatively an arc having less curvature than the center profile Si; and
the inflection point P is located within the range Y of said axial extent W1 of the longitudinal grooves.

In this specification, the normally inflated unloaded condition is such that the tire is mounted on a standard wheel rim and inflate to a standard pressure but loaded with no tire load. The standard wheel rim is a wheel rim officially approved for the tire by standard organization, i.e. JATMA (Japan and Asia), T&RA (North America), ETRTO (Europe), STRO (Scandinavia) and the like. The standard pressure and the standard tire load are the maximum air pressure and the maximum tire load for the tire specified by the same organization in the Air-pressure/Maximum-load Table or similar list. For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at various cold Inflation Pressures" table in TRA or the like. The standard load is the "maximum load capacity" in JATMA, the "Load Capacity" in ETRTO, the maximum value given in the above-mentioned table in TRA or the like.

In addition, the undermentioned normally inflated loaded condition is such that the tire is mounted on the standard wheel rim and inflate to the standard pressure and loaded with the standard tire load.

Embodiments of the present invention will now be described in detail in conjunction with the accompanying drawings.

Figure 1:
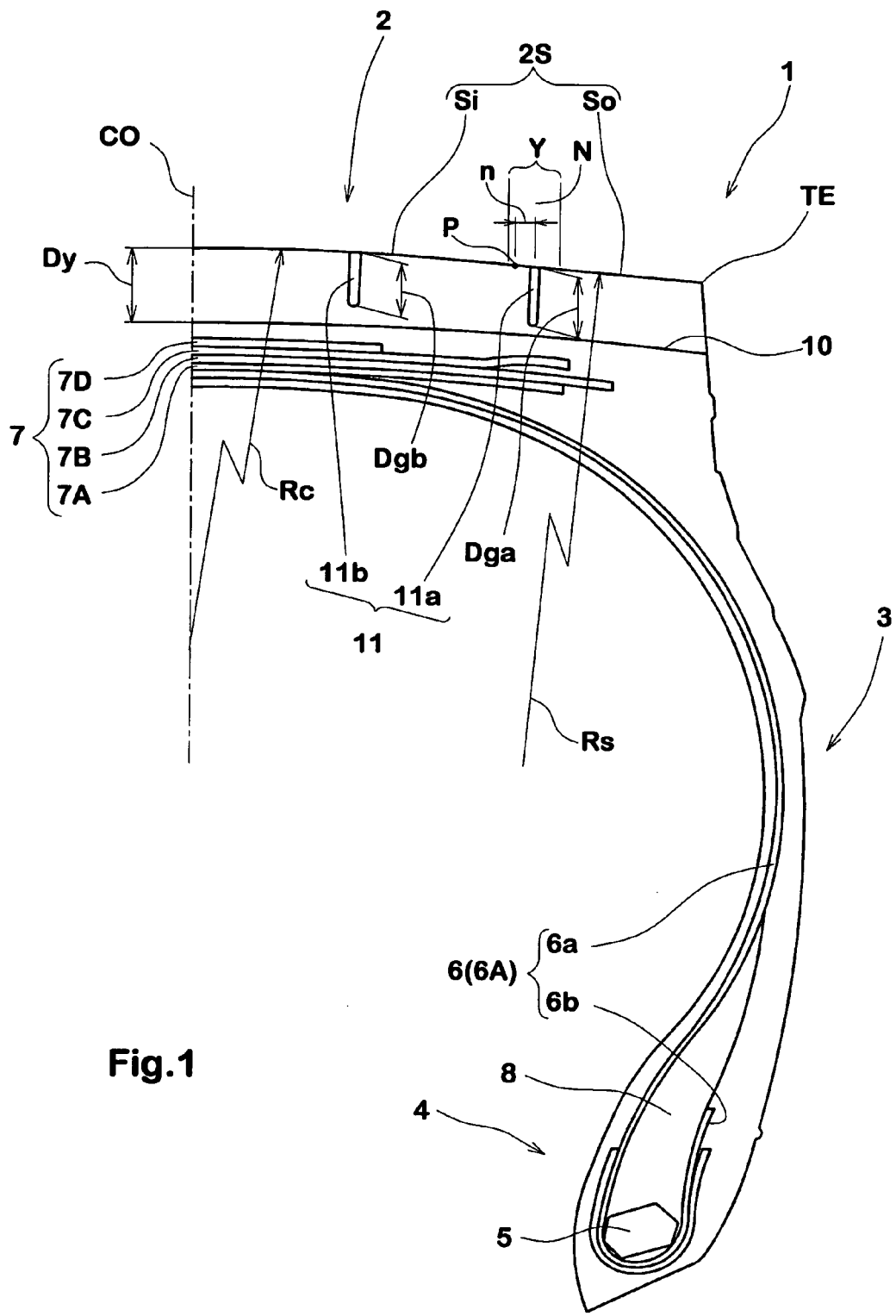
FIG. 1 is a cross sectional view of a heavy duty radial tire according to the present invention.

In the drawings, heavy duty radial tire 1 according to the present invention comprises a tread portion 2, a pair of sidewall portions 3, a pair of axially spaced bead portions 4 with a bead core 5 therein, a carcass 6 extending between the bead portions 4 through the tread portion 2 and sidewall portions 3, and a belt 7 disposed radially outside the carcass 6 in the tread portion 2.

The carcass 6 is composed of at least one ply 6A of cords arranged radially at an angle in the range of from 70 to 90 degrees with respect to the tire equator CO, extending between the bead portions 4 through the tread portion 2 and sidewall portions 3 and turned up around the bead core 5 in each bead portion 4 from the axially inside to the axially outside of the tire to form a pair of turnup portions 6b and a main portion 6a therebetween. In this embodiment, the carcass 6 is composed of a single ply 6A of steel cords arranged radially at an angle of 90 degrees with respect to the tire equator CO.

Between the main portion 6a and each of the turnup portions 6b, a bead apex 8 made of hard rubber is disposed. The bead apex 8 extends radially outwardly from the bead core 5, while tapering towards the radially outer end thereof. In this embodiment, the bead apex 8 extends into the lower sidewall portion beyond the radially outer end of the carcass turnup portion 6b.

The belt 7 is composed of at least three full-width plies of parallel cords including two cross breaker plies. In this embodiment, the belt 7 is composed of four plies of steel cords:

a radially innermost first ply 7A of steel cords laid at an angle of from 45 to 75 degrees with respect to the tire equator CO, and a radially outer second ply 7B, third ply 7c and fourth ply 7D each made of steel cords laid at an angle of from 10 to 35 degrees with respect to the tire equator CO.

Figure 2:
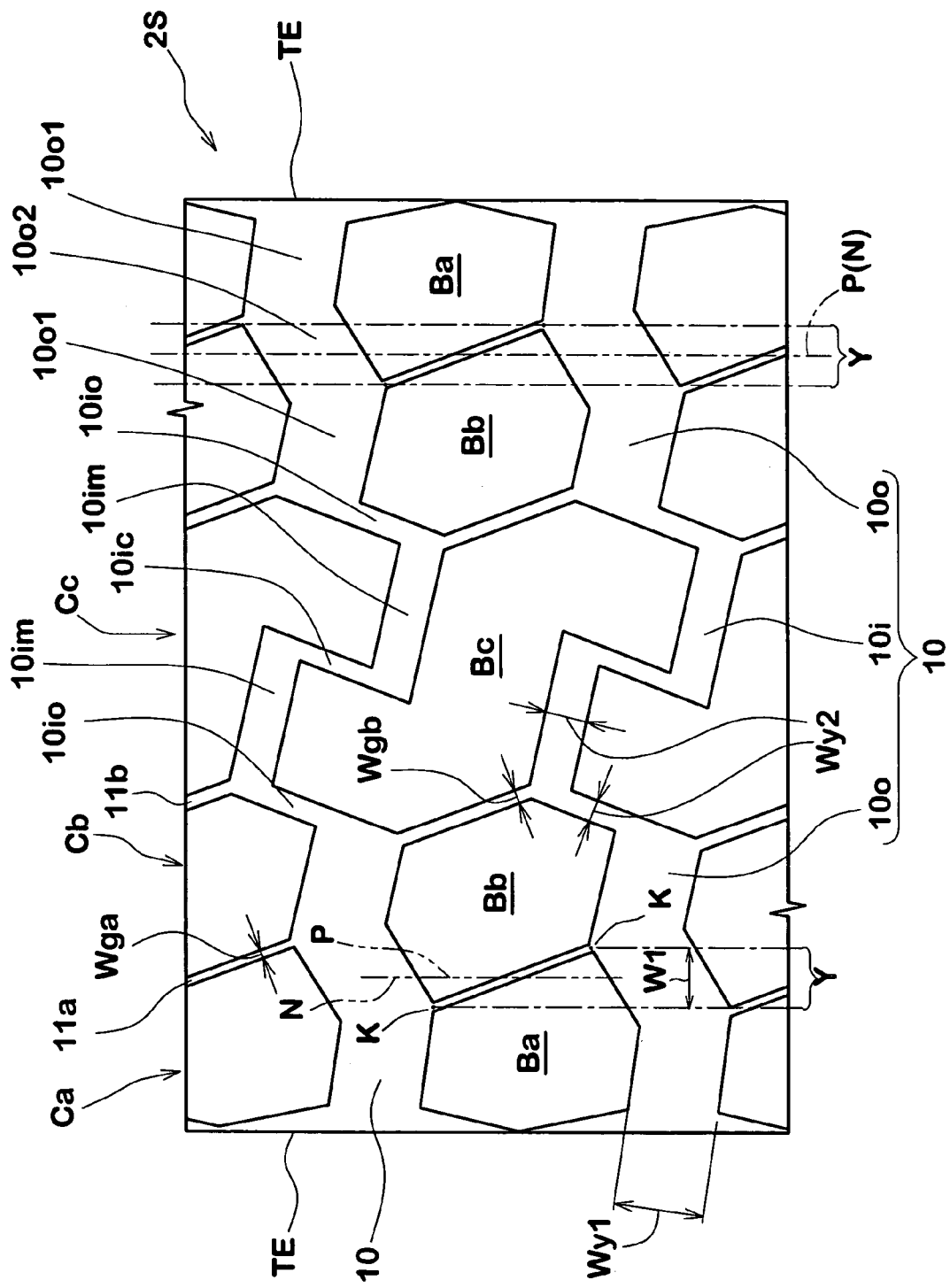
FIG. 2 is a developed partial plan view of the tread portion thereof showing an example of the tread pattern therefor.

The tread portion 2 is provided in the ground contacting region with tread grooves to define a block-type tread pattern. In this embodiment, as shown in FIG. 2, the tread grooves include:

traverse grooves 10 each extending continuously from one of the tread edges TE to the other; and longitudinal grooves 11 extending between the circumferentially adjacent traverse grooves 10, whereby the tread portion 2 is divided into tread blocks which include: shoulder blocks Ba arranged along each of the tread edges TE; and axially inner blocks Bb each adjacent to one of the shoulder blocks Ba. In this embodiment, the tread blocks further include central blocks Bc each between the axially adjacent inner blocks Bb.

In the tread portion, therefore, there are formed a central block row Cc on the tire equator CO, a pair of shoulder block rows Ca each along one of the tread edges TE, and a pair of inner block rows Cb therebetween.

The traverse groove 10 is made up of a pair of axially outer wide portions 10o and an axially inner portion 10i therebetween. The axially outer wide portions 10o extend axially inwardly from the tread edges Te so as to circumferentially divide the shoulder blocks Ba and also circumferentially divide the axially inner blocks Bb.

The axially inner portion 10i extends between the outer portions 10o so as to circumferentially divide the central blocks Bc.

In order to provide good off-road traction, the outer portion 10o is provided with
a groove width Wy1 of not less than 12 mm preferably more than 15 mm, but not more than 28 mm preferably less than 25 mm, and a groove depth Dy of not less than 15 mm preferably more than 20 mm, but not more than 24 mm preferably less than 23 mm.

The inner portion 10i is, on the other hand, provided with a groove width Wy2 less than the width Wy1 (Wy2<Wy1) so that the tread pattern circumferential rigidity is increased in the vicinity of the tire equator than the tread shoulder to thereby improve the steering stability on the well paved roads.

The traverse groove 10 is zigzagged in its entire length, and in this example, the outer portions 10o is gently zigzagged whereas the inner portion 10i is steeply zigzagged.

Each of the outer portions 10o is made up of two less inclined portions 10o1 and a more inclined portion 10o2 therebetween inclined reversibly to the less inclined portions 10o1.

Each of the inner portion 10i is made up of three steeply inclined portions 10io and 10ic and two less inclined portions 10im between them.

The less inclined portions 10o1 and 10im are inclined at the substantially same angle of 0 to 15 degrees (in this example about 10 degrees) with respect to the tire axial direction.

The more inclined portion 10o2 is inclined at an angle of 20 to 40 degrees (in this example about 30 degrees), and the steeply inclined portions 10io and 10ic are inclined in one direction almost perpendicular to the less inclined portions 10im.

As a result, the central blocks Bc have a crank or s shape as show in FIG. 2. To provide the tread center region with continuity of the ground contact during rolling, the circumferential ends of the circumferentially adjacent central blocks Bc are overlapped with each other in the tire axial direction, whereas the shoulder blocks Ba and inner blocks Bb have no overlap portions to provide big tractional force.

The above-mentioned longitudinal grooves 11 are substantially straight grooves, and in this example, the width Wg thereof is less than the minimum width of the traverse grooves 10. At any rate, it is preferable that the width Wg is set in the range of from 1.0 to 5.0 mm in order to obtain necessary wet performance while controlling the resultant lowering of the pattern rigidity as much as possible.

The longitudinal grooves 11 include: axially outer longitudinal grooves 11a dividing the shoulder blocks Ba from the inner blocks Bb; and axially inner longitudinal grooves 11b dividing the inner blocks Bb from the central blocks Bc. It is preferable for controlling uneven wear that the width Wga of the outer longitudinal grooves 11a is less than the width Wgb of the inner longitudinal grooves 11b, and the width Wga is in the range of from 1.0 to 3.0 mm.

In order to control decrease in the tread pattern lateral rigidity and to thereby improve the cornering performance and uneven wear resistance, the outer longitudinal grooves 11a are formed to be not deeper than the traverse grooves 10, namely, the depth Dga of the outer longitudinal grooves 11a is set to be not more than 1.0 times preferably less than 0.95 times, but not less than 0.7 times the maximum depth Dy of the traverse grooves 10. In this embodiment, further, the depth Dgb of the inner longitudinal grooves 11b is set to be less than the depth Dga of the outer longitudinal grooves 11a so as to increase the rigidity around the tire equator and to thereby improve the steering stability.

The outer longitudinal grooves 11a are inclined at an angle of from 15 to 30 degrees with respect to the tire circumferential direction.

In this embodiment, the outer longitudinal grooves 11a on each side of the tire equator are inclined to the same axial direction. In FIG. 2 example, further, all the outer longitudinal grooves 11a on both sides of the tire equator are inclined to the same direction at the same inclination angle.

Since the outer longitudinal grooves 11a are narrow and inclined as described above, during cornering as well as braking and driving, the outer longitudinal grooves 11a may be closed so that the shoulder block Ba and inner block Bb support each other to lessen their movements to increase the pattern rigidity.

The axial distance W1 between the ends of the outer longitudinal groove 11a measured at the center point K of the opening is set to be not less than 1.0 times preferably more than 2.0 times but not more than 10.0 times preferably less than 8.0 times the width Wga of the outer longitudinal grooves 11a. If the axial distance W1 is less than 1.0 times the groove Wga, heel and toe wear may be invited in the shoulder blocks Ba because the circumferential rigidity can not be improved effectively. If the axial distance W1 is more than 10.0 times the groove width Wga, wet performance may be deteriorated as the water drainage becomes not enough.

Figure 3:
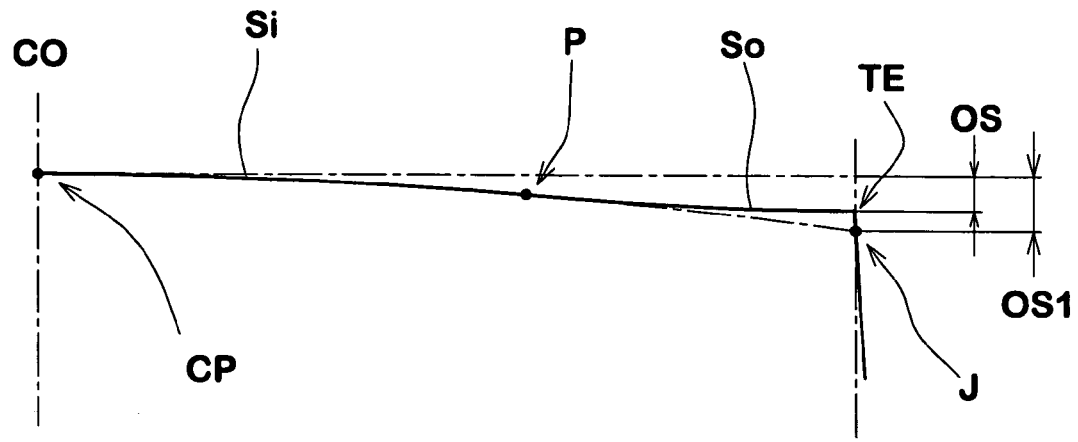
FIG. 3 shows the tread profile under the normally inflated unloaded condition.

In order to effectively control the heel and toe wear of the shoulder blocks Ba, the tread portion 2 is provided with a tread profile 2s which is, as shown in FIGS. 2 and 3, made up of a center profile Si and a shoulder profile So extending continuously from each of the axial ends of the center profile Si through an inflection point P to one of the tread edges TE.

In the cross section of the tire under the normally inflated unloaded condition, the center profile Si is a circular arc of a radius Rc having the center on the tire equatorial plane CO. The shoulder profile So is an arc of a radius Rs considerably larger than the radius Rc, namely, a substantially straight line or alternatively a straight line. In this embodiment, the shoulder profile So is straight.

The intersecting angle of the center profile Si and shoulder profile So at the point P is 180 degrees or slightly less such that, as shown in FIG. 3, the difference OS of the tire radius measured at a point CP at the tire equator CO from that at the tread edge TE is in the range of from 0.4 to 0.8 times the difference OS1 of the above-mentioned tire radius measured at the point CP from the radius measured at the intersecting point J of the above-mentioned circular arc defining the center profile Si with a radial line passing through the tread edge TE.

If the difference ratio OS/OS1 exceeds 0.8, heel and toe wear may not be controlled enough. If the difference ratio OS/OS1 is less than 0.4, the ground pressure becomes too high in the shoulder portion, and as a result, heel and toe wear may be increased in the central blocks BC. From the viewpoint of the heel and toe wear, it is desirable that the shoulder profile So is straight.

Here, it is important that the inflection point P is positioned within the axial extent Y of the axially outer longitudinal grooves 11a, preferably on the center line N of the axial extent Y. If the inflection point P comes near the center of a block (Ba or Bb), the block is liable to be twisted during running, especially running on well paved roads because the force received from the road surface is different between the axially outside and axially inside of the inflection point P due to the curvature difference, and as a results, uneven wear is liable to occur. Thus, the deviation (n) of the inflection point P from the center line N is set as small as possible. By the way, in FIG. 1, the deviation (n) is exaggerated for the porpoise of explanation only.

Figure 4:
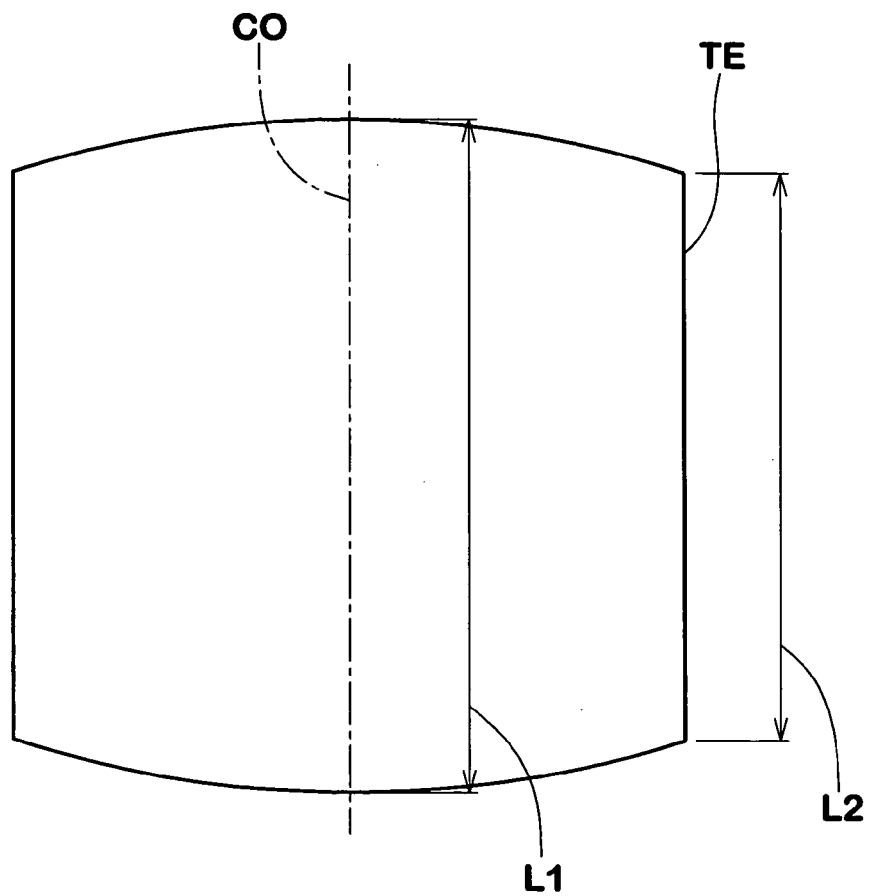
FIG. 4 is a diagram showing an outline of the ground contacting area or foot print of the tire under the normally inflated loaded condition.

As the tread portion 2 is provided with the tread profile 2S as described above, the outline of the foot print of the tire generally becomes a barrel-shape as shown in FIG. 4 under the normally inflated, loaded condition of the tire. It is preferable that the ground contacting length L1 measured at the tire equator CO is not more than 1.2 times but not less than 1.0 times the ground contacting length L2 measured at the tread edge TE. If the ratio L1/L2 exceeds 1.2, it becomes difficult to control the heel and toe wear in the shoulder portion. If the ratio L1/L2 is less than 1.0, on the contrary, heel and toe wear may be caused in the central portion (central blocks BC). Therefore, the tread profile 2S should be determined to achieve such a foot print by adjusting the above-mentioned parameters Rc, Rs, OS, OS1, W1, n and the like.

In this embodiment, to facilitate the shoulder profile So having a very large radius Rs, the widths of the above-mentioned first and third belt plies 7A and 7C are set to be the substantially same as the width between the axial outer edges of the ranges Y, and the second belt ply 7B set to be slightly wider than the first and third belt plies 7A and 7C. Further, the width of the radially outer most belt ply 7D is set to be the almost same as the maximum axial width of the central blocks BC to provide a rigid under support for the central blocks BC to further improve the steering stability and the uneven wear resistance of the central blocks BC.

Comparison Tests

Test tires of size 11R22.5 (Rim size:22.5×7.50) having the same internal structure shown in FIG. 1 and the same tread pattern shown in FIG. 2 excepting some of the parameters shown in Table 1 were made and tested for the uneven wear resistance and traction.

(1) Traction Test

The test tires were mounted on the driving wheels of a test vehicle (2-D wheel type dump truck with a carrying capacity of 10 tons) and, on a tire test road whose surface had a low frictional coefficient, the maximum of the tractional force marked at the moment when the drive wheels started to slip was measured under the full loadage of 10 tons and a tire pressure of 850 kPa. The results are indicated in Table 1 by an index based on Ref. 2 being 100. The larger the index number, the greater the tractive force.

(2) Uneven Wear Resistance Test using the above-mentioned test vehicle, road tests were conducted while measuring the depth of the inner longitudinal grooves 11b. When the decrease in the depth due to tread wear reached to 30%, the amount of heel and toe wear was measured on each of the shoulder blocks Ba and their average was obtained. The results are shown in millimeter in Table 1.

From the test results, it was confirmed that the tires according to the present invention can be improved in the uneven wear resistance and the traction on rough terrain and off-road surface.

| Tire | Ex. 1 | Ex. 2 | Ref. 1 | Ref. 2 | Ref. 3 | Ex. 3 |
|---|---|---|---|---|---|---|
| Traverse groove | | | | | | |
| width Wy1 (mm) | 20.0 | 20.0 | 20.0 | 20.0 | 20.0 | 20.0 |
| width Wy2 (mm) | 5.0/10.0 | 5.0/10.0 | 5.0/10.0 | 5.0/10.0 | 5.0/10.0 | 5.0/10.0 |
| Depth Dy (mm) | 21.5 | 21.5 | 21.5 | 21.5 | 21.5 | 21.5 |
| Longitudinal groove | | | | | | |
| width Wga (mm) | 2.0 | 2.0 | 2.0 | 2.0 | 2.0 | 2.0 |
| width Wgb (mm) | 3.0 | 3.0 | 3.0 | 3.0 | 3.0 | 3.0 |
| Depth Dga (mm) | 19.4 | 19.4 | 21.5 | 8.0 | 19.4 | 19.4 |
| Depth Dgb (mm) | 16.5 | 16.5 | 16.5 | 16.5 | 16.5 | 16.5 |
| Axial extent W1 (mm) | 13.4 | 13.4 | 3 | 4 | 13.4 | 13.4 |
| Dga/Dy | 0.90 | 0.90 | 1.00 | 0.37 | 0.90 | 0.90 |
| W1/Wga | 6.70 | 6.70 | 1.50 | 2.00 | 6.70 | 6.70 |
| L1/L2 | 1.05 | 1.13 | 1.32 | 1.36 | 1.15 | 1.02 |
| OS (mm)/OS1 (mm) | 0.44 | 0.60 | 1.00 | 1.00 | 0.75 | 0.38 |
| | (8.0/18.0) | (10.8/18.0) | (18/18) | (18/18) | (13.6/18.0) | (6.8/18.0) |
| Inflexion point P | | | none | none | | |
| within range Y? | yes | yes | NA | NA | no | yes |
| Deviation n (mm)*1 | 0 | 0 | NA | NA | −22.8 | +6 |
| Radius Rc (mm) | 750 | 560 | 750 | 750 | 750 | 750 |
| Uneven wear resistance (mm) | 0.7 | 1.0 | 3.0 | 2.5 | 2.5 | 2.0 |
| Traction | 115 | 112 | 105 | 100 | 112 | 113 |

*1) Plus (+) sign means that the deviation was toward the tire equator, and minus (−) sign means that the deviation was toward the adjacent tread edge.

The invention claimed is:

1. A heavy duty radial tire comprising
a tread portion with tread edges, the tread portion provided with traverse grooves extending between the tread edges and longitudinal grooves extending between the traverse grooves so as to form shoulder blocks arranged along each of the tread edges and inner blocks each disposed on the axially inside of one of the shoulder blocks,
the longitudinal grooves between the shoulder blocks and the inner blocks, having a depth Dga and a width Wga, the depth Dga being in a range of from 0.7 to 1.0 times the depth Dy of the traverse grooves, and
the longitudinal grooves each inclined at an acute angle with respect to the circumferential direction of the tire to have an axial extent range Y whose axial width W1 is in a range of from 1.0 to 10.0 times the width Wga,
in a cross section of the tire under a normally inflated unloaded condition:
the tread portion provided with a tread profile made up of a center profile Si and a shoulder profile So,
the shoulder profile So extending continuously from each of the axial ends of the center profile Si through an inflection point P to one of the tread edges;
the center profile Si being a circular arc of a radius Rc having the center on the tire equatorial plane;
the shoulder profile So being a substantially straight line or alternatively an arc having less curvature than the center profile Si; and
the inflection point P located within the axial extent range Y of the inclined longitudinal grooves so that on the tread face the inflection point describes a circumferentially extending straight line crossing each said inclined longitudinal groove.

2. The heavy duty radial tire according to claim 1, wherein the shoulder profile So is a straight line.

3. The heavy duty radial tire according to claim 1, wherein:
a difference OS of the tire radius measured at the tire equator from that at the tread edge is in a range of from 0.4 to 0.8 times a difference OS1 of said tire radius measured at the tire equator from a radius measured at the intersecting-point J of a radial line passing through the tread edge with said circular arc defining the center profile Si.

* * * * *